UNITED STATES PATENT OFFICE.

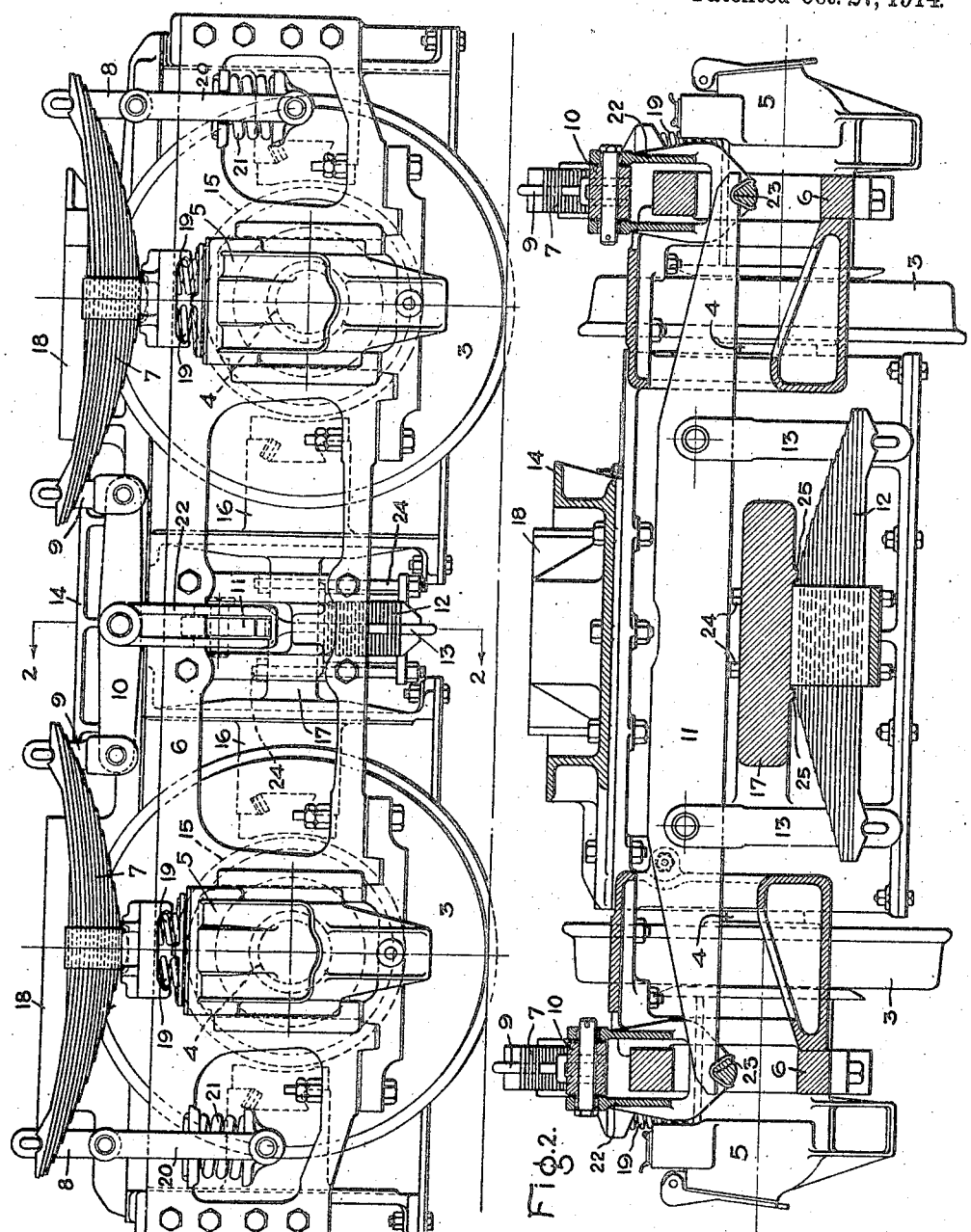

ASA F. BATCHELDER, OF GLENVILLE, NEW YORK, ASSIGNOR TO GENERAL ELECTRIC COMPANY, A CORPORATION OF NEW YORK.

LOCOMOTIVE-TRUCK.

1,115,158.

Specification of Letters Patent.   Patented Oct. 27, 1914.

Application filed July 24, 1914.   Serial No. 852,925.

*To all whom it may concern:*

Be it known that I, ASA F. BATCHELDER, a citizen of the United States, residing at Glenville, county of Schenectady, State of New York, have invented certain new and useful Improvements in Locomotive-Trucks, of which the following is a specification.

My invention relates to locomotive trucks and is particularly applicable to trucks of electric locomotives.

When a locomotive is running at high speed, there is a tendency for its wheels to go first to one side and then to the other, setting up an oscillation in the locomotive which tends to deliver blows to the track and thus strain the track in a lateral direction. Steam locomotives as usually constructed, have a narrow spring base on which the mass of the locomotive is supported, which permits the locomotive to roll when striking curves or irregularities in the track and thus lessen the blows of its wheels on the track, or in other words, the locomotive distributes its blows over a long stretch of track. The trucks of electric locomotives, however, are usually constructed with their side frames and journal boxes outside of the wheels in order to make room for the electric motors between the wheels. Such a construction has a wide spring base for the support of the mass of the locomotive which does not lend itself so readily to the rolling of the mass as in steam locomotives.

My invention has for its object a novel construction of a locomotive truck which, when used in such electric locomotives as described above, or other locomotives, has the same rolling effect as a steam locomotive. To this end my invention consists in a novel arrangement and construction of parts which will be particularly pointed out in the claims annexed to and forming a part of this specification.

For a better understanding of my invention reference may be had to the following description taken in connection with the accompanying drawing in which—

Figure 1 is a side view of a truck of an electric locomotive embodying my invention, and Fig. 2 is a sectional view of the truck of Fig. 1 taken on the line 2—2.

Referring to the drawing, the truck is shown as provided with two pairs of wheels 3, the axles 4 of which are journaled in journal boxes 5. These journal boxes are slidably mounted for limited movement in side frames 6 of the truck frame in the well known manner. The truck frame is supported upon the journal boxes by means of a lever system which supports each side frame jointly on the journal boxes therein, and on an equalizing lever through a spring. Above each journal box is a spring 7 which is mounted thereon. The springs 7 are preferably leaf springs with their middle points mounted on the journal boxes. The links 8 connect one end of each of the springs to the side frame, and links 9 connect the other end of the springs to levers 10, one of the levers 10 being on one side of the truck frame and the other on the other side. An equalizing lever 11 extending crosswise of the truck frame is supported by the levers 10. The truck frame is resiliently supported on this equalizing lever through a spring such as the leaf spring 12, which extends crosswise of the truck frame and beneath the same. I preferably place the equalizing lever 11 and the spring 12 between the wheel axles because with such an arrangement the movement of the truck frame relatively to the ends of the equalizing lever is a minimum. Links 13 are shown for supporting the spring 12 from the equalizing lever 11. The length of the spring 12 crosswise of the truck determines the width of the spring base on which the mass of the locomotive is supported. This width may be anything desired and may be made equal to the spring base of a steam locomotive whereby the same rolling effect will be obtained in an electric locomotive as in a steam locomotive.

I have shown my invention embodied in a rigid truck designed to be fastened to the platform of the locomotive by means of a member 14. It is provided with the well known bipolar type of motors having armatures 15 surrounding axles 4 and frames 16 rigidly connected to the truck frame. The frames 16 are connected together by means of a magnetic member 17, and consequently the magnetic flux passing through the frame and armature of one motor then passes through the member 17, through the frame and armature of the other motor and returns through the truck frame. It will, therefore, be seen that the motor frame and the member 17 are built into the truck frame and form a part thereof. Ducts 18 are shown which convey cooling air to the electric motors. Instead of mounting the leaf springs 7 directly on the journal boxes, I have shown them as being mounted thereon through springs 19. The links 8 support the side frames through hangers 20 and springs 21.

In order to support the equalizing lever 11 by the levers 10, hangers 22 are pivotally connected to the levers 10 and are provided with knife edges 23 on which the equalizing lever 11 rests. The spring 12 is shown as being fastened beneath the truck frame to the member 17 by means of bolts 24. If the center of gravity of the spring supported mass is low, the bolts 24 fastening the spring 12 to the truck frame may be omitted, in which case the upward pull of the parts on the links 13 and the weight of the truck frame exerting a downward force will keep the spring 12 in contact with the member 17, the stops 25 preventing the displacement of the spring. Such an arrangement allows a freer movement of the spring supported mass. Furthermore I desire it to be understood that I aim in the appended claims to cover such a modification as well as any others which do not depart from the spirit and scope of my invention.

What I claim as new and desire to secure by Letters Patent of the United States, is:—

1. In a locomotive truck, two wheel axles, journal boxes therefor, a truck frame having side frames in which said journal boxes are slidably mounted, a spring arranged above each journal box and mounted thereon, links and a lever for hanging each of said side frames on the two springs on each side jointly, an equalizing lever supported by said first mentioned levers and extending crosswise of said truck frame, and means for resiliently supporting said truck frame on said equalizing lever.

2. In a locomotive truck, two wheel axles, journal boxes therefor, a truck frame having side frames in which said journal boxes are slidably mounted, a spring arranged above each journal box and mounted thereon, links and a lever for hanging each of said side frames on the two springs on each side jointly, an equalizing lever supported by said first mentioned levers and extending crosswise of said truck frame, and means for resiliently supporting said truck frame between said wheel axles on said equalizing lever.

3. In a locomotive truck, two wheel axles, journal boxes therefor, a truck frame having side frames in which said journal boxes are slidably mounted, a spring arranged above each journal box and mounted thereon, links and a lever for hanging each of said side frames on the two springs on each side jointly, an equalizing lever supported by said first mentioned levers, a leaf spring extending crosswise of said truck frame and beneath the same, and means for supporting said leaf spring from said equalizing lever.

4. In a locomotive truck, two wheel axles, journal boxes therefor, a truck frame having side frames in which said journal boxes are slidably mounted, a spring arranged above each journal box and mounted thereon, links and a lever for hanging each of said side frames on the two springs on each side jointly, an equalizing lever supported by said first mentioned levers, a leaf spring extending crosswise of said truck frame, beneath the same and between said wheel axles, and means for supporting said leaf spring from said equalizing lever.

5. In a locomotive truck, two wheel axles, journal boxes therefor, a truck frame having side frames in which said journal boxes are slidably mounted, a spring arranged above each journal box and mounted thereon, links and a lever for hanging each of said side frames on the two springs on each side jointly, an equalizing lever supported by said first mentioned levers, a leaf spring fastened crosswise of said truck frame, and links for supporting said leaf spring from said equalizing lever.

6. In a locomotive truck, two wheel axles, journal boxes therefor, a truck frame having side frames in which said journal boxes are slidably mounted, a spring arranged above each journal box and mounted thereon, links and a lever for hanging each of said side frames on the two springs on each side jointly, an equalizing lever supported by said first mentioned levers, a leaf spring fastened crosswise of said truck frame between said wheel axles, and links for supporting said leaf spring from said equalizing lever.

7. In a locomotive truck, two wheel axles, journal boxes therefor, a truck frame having side frames in which said journal boxes are slidably mounted, a leaf spring arranged above each journal box with its middle point mounted thereon, links for connecting one end of each of said springs to said side frames, a lever on each side of said truck, links for connecting the other end of said springs on each side with each of said levers, an equalizing lever supported by said first mentioned levers and extending crosswise of said truck frame, and means for resiliently supporting said truck frame between said wheel axles on said equalizing lever.

8. In a locomotive truck, two wheel axles, journal boxes therefor, a truck frame having side frames in which said journal boxes are slidably mounted, a leaf spring arranged above each journal box with its middle point mounted thereon, links for connecting one end of each of said springs to said side frames, a lever on each side of said truck, links for connecting the other end of said springs on each side with each of said levers, an equalizing lever supported by said first mentioned levers and extending crosswise of said truck, a leaf spring extending crosswise of said truck frame, beneath the same and between said wheel axles, and means for supporting said last mentioned leaf spring from said equalizing lever.

9. In a locomotive truck, two wheel axles, journal boxes therefor, a truck frame having side frames in which said journal boxes are slidably mounted, a leaf spring arranged above each journal box with its middle point mounted thereon, links for connecting one end of each of said springs to said side frames, a lever on each side of said truck, links for connecting the other end of said springs on each side with each of said levers, an equalizing lever supported by said first mentioned levers, a leaf spring extending crosswise of said truck frame, beneath the same and between said wheel axles, and links for supporting said last mentioned leaf spring from said equalizing lever.

10. In a locomotive truck, two wheel axles, journal boxes therefor, a truck frame having side frames on which said journal boxes are slidably mounted, a leaf spring arranged above each journal box with its middle point mounted thereon, links for connecting one end of each of said springs to said side frames, a lever on each side of said truck, links for connecting the other end of said springs on each side with each of said levers, an equalizing lever supported by said first mentioned levers and extending crosswise of said truck, a leaf spring fastened crosswise of said truck frame, and means for supporting said last mentioned leaf spring from said equalizing lever.

11. In a locomotive truck, two wheel axles, journal boxes therefor, a truck frame having side frames on which said journal boxes are slidably mounted, a leaf spring arranged above each journal box with its middle point mounted thereon, links for connecting one end of said springs to said side frames, a lever on each side of said truck, links for connecting the other end of said spring on each side with each of said levers, an equalizing lever supported by said first mentioned levers and extending crosswise of said truck, a leaf spring fastened crosswise of the said truck frame between said wheel axles, and links for supporting said last mentioned leaf spring from said equalizing lever.

In witness whereof, I have hereunto set my hand this 23rd day of July, 1914.

ASA F. BATCHELDER.

Witnesses:
BENJAMIN B. HULL,
A. C. STAPLETON.